No. 891,339. PATENTED JUNE 23, 1908.
F. HIRT.
RAILWAY SIGNAL.
APPLICATION FILED DEC. 11, 1907.
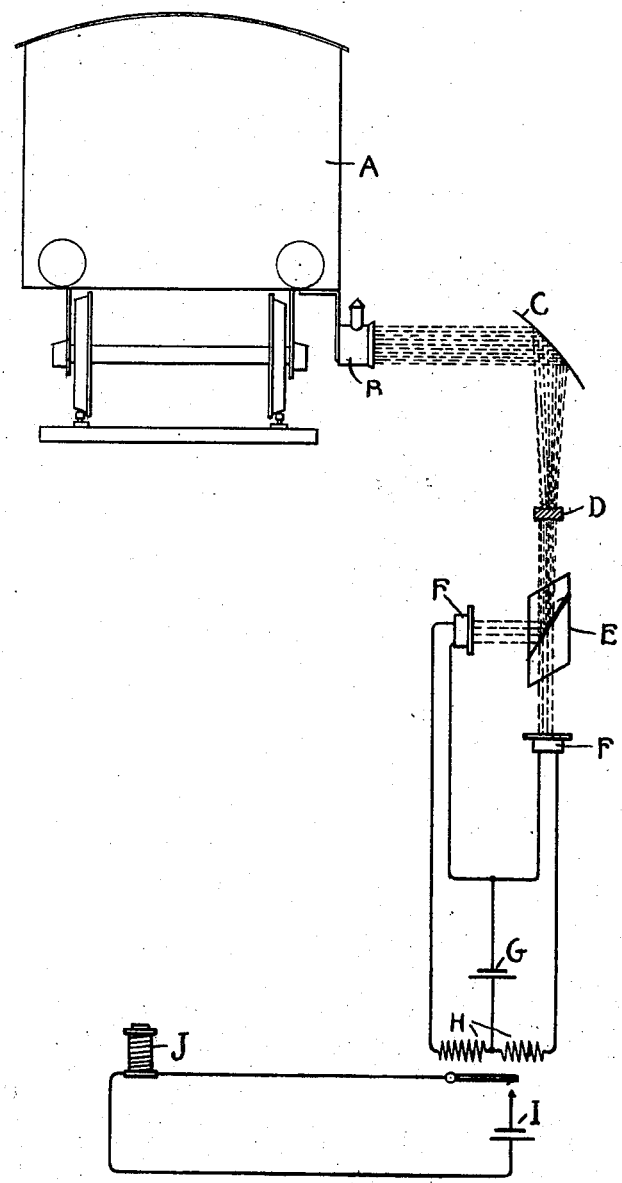
Witnesses.
Earl G. Klock.
J. Ellis Glen
Inventor.
Franz Hirt,
by Albert G. Davis
Att'y

UNITED STATES PATENT OFFICE.

FRANZ HIRT, OF BERLIN, GERMANY, ASSIGNOR TO GENERAL ELECTRIC COMPANY, A CORPORATION OF NEW YORK.

RAILWAY-SIGNAL.

No. 891,339.　　　　Specification of Letters Patent.　　　Patented June 23, 1908.

Application filed December 11, 1907. Serial No. 406,030.

*To all whom it may concern:*

Be it known that I, FRANZ HIRT, a subject of the Emperor of Germany, residing at Berlin, Germany, have invented certain new and useful Improvements in Railway-Signals, of which the following is a specification.

My invention relates to railway signals, the control of which is secured by the coöperation of selenium cells placed along the track and sources of light on the cars. The resistance of a selenium cell varies with the amount of light to which the cell is exposed, as is well known in the art, and this characteristic may be utilized to control a signal by placing a selenium cell close to the track and providing means on the car for throwing light on the cell in passing.

A signal system thus arranged is subject, to a certain extent, to disturbances produced by variations in the light falling on the cell from other sources than that of a passing car. For instance, the variation of sunlight during the day may exercise a disturbing influence on the cell and the devices in circuit with it.

My invention has for its object the elimination of such disturbances. To that end I take advantage of the different effects obtainable from ordinary or unpolarized light and polarized light.

My invention consists in providing signal controlling means responsive only to polarized light, and means on the cars or locomotives for throwing polarized light on the signal controlling devices in passing. By means of this arrangement the signals are freed from outside disturbances.

My invention will best be understood by reference to the accompanying drawing, which shows diagrammatically a signal system arranged in accordance with my invention.

In the drawing A represents a car or other vehicle carrying a source of polarized light B. The polarization may be produced in any well known manner. As the car passes, the light is caught by a reflector C and directed through a lens D on the Nicols prism or other double-refracting body E. The effect of a Nicols prism on polarized light is, as is well known, to refract unpolarized light in two sets of rays. In the paths of these two sets of rays are placed the two selenium cells F F in circuit with the battery G. In series with the cells are placed the opposing windings of a differential relay H, which controls the circuit of a suitable source of current I and the signal-operating mechanism indicated diagrammatically at J.

If the light from the source B were unpolarized, or if light from the sun, or any other source, were to fall on the reflector C, its rays would be thrown in approximately equal proportions on the two cells F F, so that the currents in the opposing windings of the differential relay H would neutralize each other; but if the light thrown from the source B is polarized, then only one set of rays is refracted from the prism E, so that light is thrown on only one selenium cell. This produces a difference in the resistances of the two cells, resulting in an unbalancing of the currents in the opposing windings of the differential relay H, which is consequently energized, and responds to control the signal.

I do not desire to limit myself to the particular construction and arrangement of parts here shown, but aim in the appended claims to cover all modifications which are within the scope of my invention.

What I claim as new and desire to secure by Letters Patent of the United States, is,—

1. In a railway signaling system, signal-operating means, controlling means therefor responsive only to polarized light, and means carried by a vehicle for throwing polarized light on said controlling means.

2. In a railway signaling system, a source of polarized light carried by a vehicle, and signal controlling means responsive only to polarized light.

3. In a railway signaling system, a double-refracting body, a pair of devices that vary in electric resistance with variation in light exposed respectively to the two sets of rays refracted from said body, electro-magnetic signal-controlling means responsive to a difference in the resistances of said devices, and means carried by a vehicle throwing polarized light on said body.

4. In a railway signaling system, a double-refracting body, a pair of selenium cells exposed respectively to the two sets of rays refracted from said body, opposing magnet windings in circuit with said cells respectively, signal-operating means controlled by the differential action of said windings, and
5 means carried by a vehicle for throwing polarized light on said body.

In witness whereof, I have hereunto set my hand this twenty-sixth day of November, 1907.

FRANZ HIRT.

Witnesses:
   JULIUS RUMLAND,
   KARL GRIEKEBEN.